US008314733B1

(12) United States Patent
Malakian et al.

(10) Patent No.: US 8,314,733 B1
(45) Date of Patent: Nov. 20, 2012

(54) ADJUSTMENT OF RADAR PARAMETERS TO MAINTAIN ACCELERATING TARGET IN TRACK (75) Inventors: Kourken Malakian, Mount Laurel, NJ (US); Stephen J. Salvatore, Mount Laurel, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 434 days.

(21) Appl. No.: 12/578,094

(22) Filed: Oct. 13, 2009

(51) Int. Cl.
*G01S 13/66* (2006.01)
*G01S 7/40* (2006.01)
*G01S 13/00* (2006.01)

(52) U.S. Cl. ............ 342/95; 342/73; 342/89; 342/94; 342/104; 342/106; 342/115; 342/118; 342/165; 342/173; 342/195

(58) Field of Classification Search ............ 342/61–67, 342/73–115, 118, 146, 147, 158, 175, 195, 342/196, 13–20, 29, 41, 52, 165, 173, 174; 244/3.1, 3.15, 3.19
See application file for complete search history.

(56) References Cited

U.S. PATENT DOCUMENTS

| | | | | |
|---|---|---|---|---|
| 3,293,641 A | * | 12/1966 | Bennett et al. | 342/65 |
| 3,680,093 A | * | 7/1972 | Brown | 342/52 |
| 3,717,873 A | * | 2/1973 | Riggs | 342/41 |
| 3,725,918 A | * | 4/1973 | Fleischer et al. | 342/41 |
| 3,737,902 A | * | 6/1973 | O'Hagan et al. | 342/41 |
| 4,148,029 A | * | 4/1979 | Quesinberry | 342/67 |
| 4,163,975 A | * | 8/1979 | Guilhem et al. | 342/94 |
| 4,217,581 A | * | 8/1980 | Prickett | 342/95 |
| 4,241,889 A | * | 12/1980 | Schwellinger et al. | 342/17 |
| 4,589,610 A | * | 5/1986 | Schmidt | 342/62 |
| 4,783,744 A | | 11/1988 | Yueh | |
| 4,816,833 A | * | 3/1989 | Ferguson et al. | 342/95 |
| 4,916,448 A | * | 4/1990 | Thor | 342/65 |
| 4,939,513 A | * | 7/1990 | Paterson et al. | 342/65 |
| 5,034,748 A | * | 7/1991 | Goedeke et al. | 342/99 |
| 5,131,602 A | * | 7/1992 | Linick | 342/62 |
| 5,214,433 A | * | 5/1993 | Alouani et al. | 342/95 |
| 5,313,212 A | * | 5/1994 | Ruzicka | 342/101 |
| 5,325,098 A | * | 6/1994 | Blair et al. | 342/95 |
| 5,479,360 A | * | 12/1995 | Seif et al. | 342/95 |
| 5,525,995 A | * | 6/1996 | Benner | 342/90 |

(Continued)

FOREIGN PATENT DOCUMENTS

EP 0607015 A1 * 7/1994

OTHER PUBLICATIONS

Luu et al, "Kinermatic Algorithm for Rocket Mortar Apperception," U.S. Appl. No. 11/879,538, filed Jul. 18, 2007.

(Continued)

*Primary Examiner* — Bernarr Gregory
(74) *Attorney, Agent, or Firm* — Howard IP Law Group, PC (57) ABSTRACT

A radar system tracks targets, and for each target determines the maximum acceleration of the target which can be tracked. The target acceleration is compared with the maximum acceleration that the radar can maintain in track, and if the decision is that the radar cannot maintain track, the radar data rate is increased, at least for that target. In at least some cases in which the target acceleration is such that the target can be maintained in track, the data rate for that target is decreased.

20 Claims, 3 Drawing Sheets

U.S. PATENT DOCUMENTS

| | | | |
|---|---|---|---|
| 5,631,653 A * | 5/1997 | Reedy | 342/62 |
| 5,999,117 A * | 12/1999 | Engel | 342/95 |
| 6,064,332 A * | 5/2000 | Cloutier | 342/62 |
| 6,211,810 B1 * | 4/2001 | Schirf | 342/95 |
| 6,244,536 B1 * | 6/2001 | Cloutier | 342/62 |
| 6,538,599 B1 * | 3/2003 | David | 342/196 |
| 6,691,034 B1 * | 2/2004 | Patera et al. | 342/29 |
| 7,009,554 B1 | 3/2006 | Mookerjee et al. | |
| 7,026,980 B1 | 4/2006 | Mavroudakis et al. | |
| 7,180,443 B1 | 2/2007 | Mookerjee et al. | |
| 7,185,844 B2 * | 3/2007 | Yanushevsky | 342/62 |
| 7,187,320 B1 * | 3/2007 | Yang | 342/74 |
| 7,295,149 B1 | 11/2007 | Wolf | |
| 7,394,047 B1 | 7/2008 | Pedersen | |
| 7,511,252 B1 | 3/2009 | Pedersen et al. | |
| 7,626,538 B2 * | 12/2009 | Rose | 342/195 |
| 7,663,528 B1 * | 2/2010 | Malakian et al. | 342/13 |
| 7,671,787 B2 * | 3/2010 | Kinoshita et al. | 342/61 |
| 7,755,011 B2 * | 7/2010 | Lam et al. | 342/62 |
| 7,898,466 B1 * | 3/2011 | Malakian et al. | 342/95 |

OTHER PUBLICATIONS

Luu et al, "Template Updated Boost Algorithm," U.S. Appl. No. 11/868,554, filed Oct. 8, 2007.

* cited by examiner

ADJUSTMENT OF RADAR PARAMETERS TO MAINTAIN ACCELERATING TARGET IN TRACK

BACKGROUND OF THE INVENTION

Modern military radar systems face increasingly difficult operational demands. Surveillance may require constant scanning of a hemisphere for targets having small radar cross-sections and which move at high speed, such as incoming cruise missiles. Simultaneous with this surveillance, the radar may be required to individually track identified targets, which may number in the tens or even in the hundreds. The power transmission and processing capability are strained by the combination of such requirements.

Figure 1:
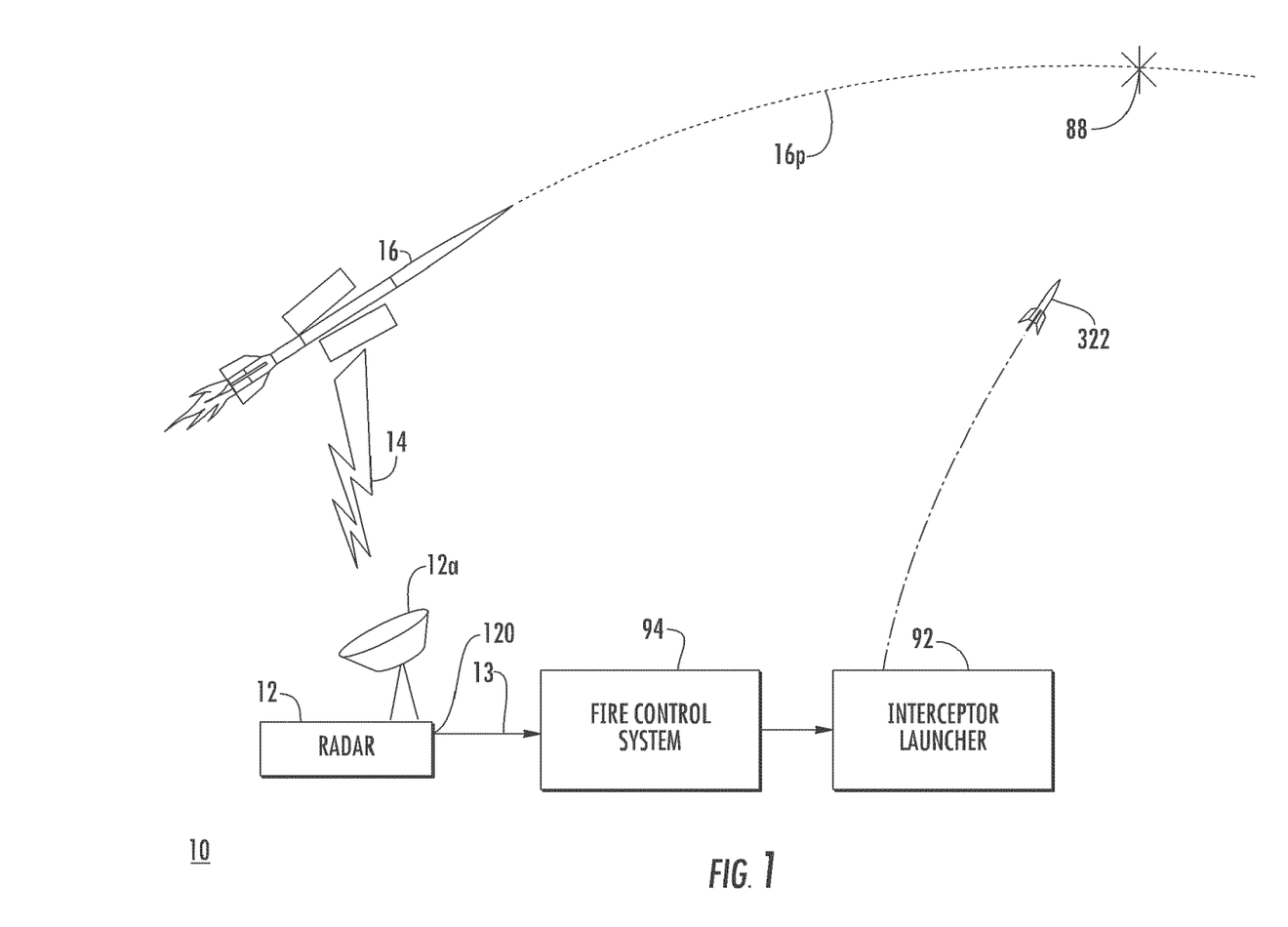
FIG. 1 is a simplified diagram of a scenario in which a hostile target missile is detected or tracked by a radar, a fire control system estimates the future location of the target missile, and an interceptor missile is launched to engage the target missile at an intercept point, as described in U.S. patent application Ser. No. 12/051,892, filed Mar. 20, 2008 in the name of Malakian et al., and entitled Missile Boost-Ballistic Estimator; now U.S. Pat. No. 7,663,528

New and emerging threats further complicate the problem of providing radar resources. One of the more serious recent threat capabilities which tends to limit radar resources is that of hostile or "threat" targets which maneuver with accelerations of several times the force of gravity (g's). Such maneuvering targets can cause a radar system to lose track or fail to update the position of the target. If the target is hostile, the loss of track can compromise the ability to take successful countermeasures, such as engagement of the target with an interceptor missile. FIG. 1 illustrates in an overall fashion a scenario in which the maintenance of track is important, as described in U.S. Pat. No. 7,663,528, to Malakian et al., entitled Missile Boost-Ballistic Estimator now U.S. Pat. No. 7,663,528. In FIG. 1, a system 10 includes a radar 12 with an antenna illustrated as 12a, which may be an array antenna. Radar 12 generates electromagnetic signals which are transmitted by antenna 12a, as suggested by "lightning bolt" symbol 14. Radar 12 can operate in both a volume surveillance and target tracking mode. If there is a target within range of the radar 12, a portion of the transmitted signals will be reflected back toward the radar. In this case, a hostile target illustrated as a missile 16 is present. Missile 16 may be in powered (boost) flight, or it may be in unpowered (ballistic) flight. In any case, target 16 causes reflected or return signals return along the same path illustrated as 14 to the radar system. The radar system 12 processes the reflected signals to produce information relating to at least target slant range, and possibly bearing and elevation. These are referred to as "kinematic" features of the target. Target velocity and acceleration are determined by examining the position as a function of time, and acceleration is determined as the rate of change of velocity. The kinematic features, velocity and acceleration appear at an output port 12o of radar 12, and are coupled to an interceptor missile fire control system 94. Fire control system 94 estimates the actual current location of the target missile 16, and also estimates its trajectory or path 16p. Fire control system 94 generates fire control solutions, initiates the interceptor missile 322 while it is still at the interceptor launcher 92. Fire control system 94 commands a launch of the interceptor missile, and also tracks the location of the interceptor missile 322. Fire control system 94 guides the interceptor 322 toward the expected intercept point 88 after launch.

In its volume surveillance mode, radar 12 of FIG. 1 must provide information relating to all the targets within its surveillance volume. This surveillance volume may include many targets, including friendly targets, neutral targets, hostile targets, and targets of unknown nature. Modern radar systems generally use array antennas, well known in the art. Volume surveillance is accomplished with array antennas by generating separate beams in sequence. These separate beams are generated in sequence, and the beamwidths are selected to overlap, so that over a full volume scan all targets in the volume are illuminated with at least some energy. The rapidity of the generation of the pencil beams during volume scanning depends, at least in part, on the time required for the transmitted electromagnetic energy to travel to the target and for the reflection from the target to return to the radar. Such volume scanning requires generation of many "pencil" beams as quickly as the energy travel time allows. Ideally, the pencil beams have narrow beamwidth, in order to aid in particularly identifying the azimuth and elevation angle at which each target appears. However, the use of pencil beams that are very narrow undesirably increases the time required for a complete volume scan. The use of narrow beams is desirable in the tracking mode, however. Thus, there is a tension between the beamwidth requirements for optimal tracking and optimal volume surveillance.

Ideally, each mode of operation of a multimode volume search and tracking radar would use a number of pulses per unit time optimized for the range and size of the target to be searched for or tracked. Thus, more pulses per unit time can be used to increase the number of reflected signals from the target and to thereby improve the signal-to-noise ratio, but this adversely affects the amount of radar resources required for other functions, such as search or tracking, and also adversely affects the number of target objects that the radar can handle.

Alternative or improved radar systems are desired.

SUMMARY OF THE INVENTION

A tracking radar system according to an aspect of the invention is for transmitting electromagnetic signals toward a tracked target, and for receiving and processing reflected signals to determine at least the location of the tracked target. The radar system comprises a transmitter/receiver, which transmitter/receiver includes an antenna, an exciter, and a controllable beam scheduler, for illuminating the tracked target at a rate established by the beam scheduler. A track processor is coupled to the transmitter/receiver, for determining the acceleration of each target in track. A radar resource evaluator is coupled to the track processor for determining the maximum target acceleration which can be maintained in track for each target. An acceleration comparator is coupled to the track processor and to the resource evaluator, for making a decision as to whether each target can be maintained in track. A data rate selector controls the beam scheduler in response to the decision so as to increase the radar resources available for tracking at least some of the targets for which the decision is negative. In one embodiment of the radar system, the data rate selector increases the beam schedule rate for at least some of the targets for which the decision is negative. In another embodiment, the data rate selector decreases the beam schedule rate for at least some of the targets for which the decision is positive. In a particular embodiment, the radar resource evaluator includes processing which solves the following expression for the maximum target acceleration A that the radar system can track $$A_{j+1} = \frac{R(BW)}{(\tau_j + T)^2} - \frac{2K\sigma_M}{\tau_j(\tau_j + T)^2}$$

where $$\tau_j = T^{\frac{1}{5}} \left( \frac{3n\sigma_M}{2A_j} \right)^{\frac{2}{5}}$$

and:
R is radar slant range;
BW is antenna beamwidth;
K is containment probability factor;
n is a filter factor;
$\sigma_m$ is measurement error standard deviation;
$\tau$ is filter lag; and
T is the data rate.

A method according to an aspect of the invention is for optimizing the operation of a radar system operable in target tracking mode. The method comprises the steps of transmitting electromagnetic energy into space by way of an antenna, and receiving reflected energy from one or more targets. The antenna may be an array antenna. The reflected energy is processed to either start a new track or to update an existing track. The motion of the target in question is examined to determine if the target is maneuvering. If the target is identified as not maneuvering, a first selected target update time is assigned. If the target is identified as maneuvering, a second selected target update time is assigned, which is shorter or less than the first selected target update time. In a particular mode of the method, the identification as maneuvering includes identification as boosting or as ballistic maneuvering.

A method for operating a radar system which includes a transmitter, a receiver, and processing for generating target tracks, where the radar system defines a look rate. The method comprises the steps of operating the radar with a selected antenna beamwidth, look rate, and standard deviation of the angular error, to generate target track information. The range to each target is determined. At least tracker containment probability factor, containment probability confidence factor of the filter error, filter lag, and filter gains are determined. The maximum target maneuver radar capability is determined. If the maximum target maneuver radar capability is exceeded by a target, the data rate is increased for at least that target, to thereby increase the maximum target maneuver radar capability so as to tend to maintain the target in track.

DESCRIPTION OF THE INVENTION

Prior-art radar systems adjust their parameters in the various operating modes, tending to use data rates which guarantee that an object can be kept in track.

Figure 2:
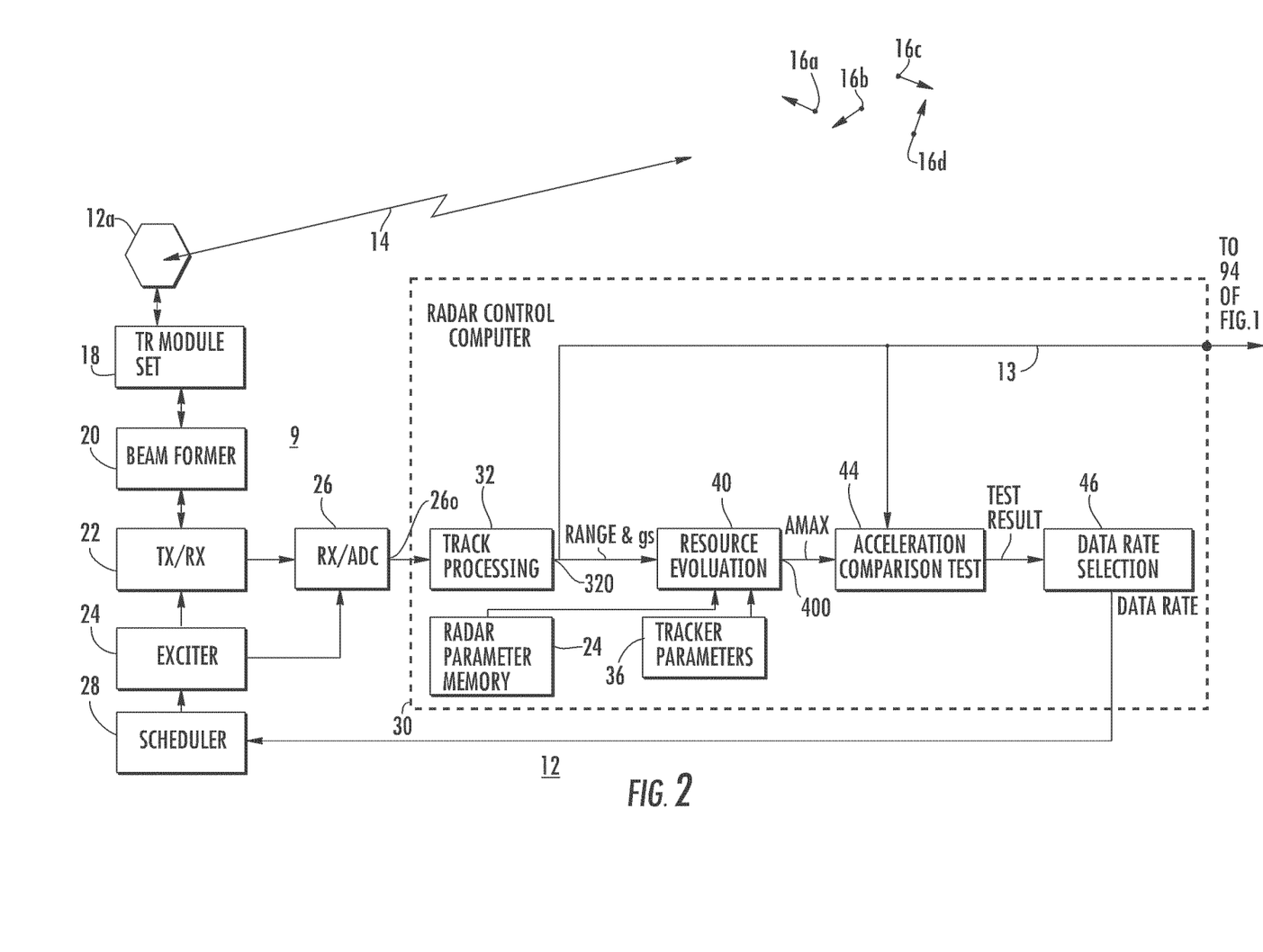
FIG. 2 is a simplified block diagram of a radar system according to an aspect of the invention, in which a target track processor detects acceleration of in-track targets, compares the acceleration of each target with a maximum acceleration which can be kept in track, and which readjusts the radar tracking parameters in response to the comparison to improve the likelihood that track will be maintained.

In FIG. 2, radar 12 includes an electromagnetic transmitter/receiver 9, which includes a transmit-receive (TR) module set illustrated as a block 18 associated with an array antenna 12a. The TR modules, as known, amplify the transmitted and received signals for each element of array antenna 12a. Exciter signals from a controllable exciter 24 of transmitter/receiver 9 are applied by way of a transmit/receive function (Tx/Rx) and a beamformer 20 to the TR modules 18 for transmission of electromagnetic signals. Exciter 24 is commanded to produce transmit signals under control of a beam scheduler illustrated as a block 28. Electromagnetic return signals reflected from targets illustrated as 16a, 16b, 16c, and 16d are received by the elements of array antenna 12a, and amplified by the various TR modules, and coupled by way of the beamformer 20 to the Tx/Rx function 22. The return signals are routed by Tx/Rx function 22 to a receiver (Rx) and analog-to-digital converter (ADC) arrangement illustrated as an Rx/ADC block 26. The receiver 26 performs various filtration, frequency conversion, and amplification functions on the received analog signal, and converts it into digital form. Alternatively, the receiver processing may be principally digital. In any case, digital representations of the received return signals appear at output port 26o of receiver 26.

A radar control computer illustrated as 30 in FIG. 2 receives the digital return signals from Rx/ADC 26. A track processing and filtering function, illustrated as a block 32, tracks the motion of each target by generating information detailing its current and former locations. Block 32 produces at its output port 32o-information including the range of each target, its location as identified by the antenna beam in which it resides, and calculates its velocity as the rate of change of position, and also determines its acceleration. At least the target range and location information flows from port 32o by way of a path 13 to fire control system 94 of FIG. 1. Block 32 also includes a two-filter maneuver detector and probability calculation which estimates whether the target is maneuvering or not maneuvering. The outputs of block 32, including the target acceleration in terms of multiples of the force of gravity (gs) are applied to a resource evaluation block 40. Resource evaluation block 40 calculates Amax, the maximum target acceleration that the radar system can handle, or for which the target can be kept in track.

In order to evaluate resources, resource evaluation block 40 of FIG. 2 also receives inputs from a radar parameter memory 34 and tracker parameters from a memory 36. Radar parameter memory 34 stores information relating to the radar and especially the tracking algorithms, including such information as antenna beamwidth (BW), angular error standard deviation $\sigma_A$, and look rate (T). Tracker parameter memory 36 stores such information as containment probability factor (k), containment probability confidence factor of the filter error (n), filter lag ($\tau$) and filter gains $\alpha$ and $\beta$. The estimated maximum allowable acceleration Amax as determined by block 40 appears at output port 40o, and is applied to an acceleration comparison block 44. Acceleration comparison block 44 compares the estimated target acceleration from path 13 with the maximum acceleration which the radar can maintain in track from block 40. The result of this comparison is a binary decision to the effect that the particular target either can or cannot be reliably maintained in track. This binary may be called the Can-Track/Can't-Track decision. The binary Can-Track/Can't-Track decision is applied from block 44 to a block 46. Block 46 represents the incrementing or decrementing selection of the radar data rate for that particular target in response to the Can-Track/Can't-Track decision of block 44. The commanded data (or pulse) rate (generally expressed in Hz) of the radar system is incremented in block 46 in response to each "Can't-Track" decision from block 44. Thus, so long as the closed-loop radar resource controller iterates, the data rate applied toward tracking a particular target ratchets upward or increases with each "Can't-Track" decision for that target. These cycles occur very quickly, so the radar data rate increases quickly in response to the commands. The data rate commands from block 46 are applied by way of a path 12 to the radar scheduler, which commands the generation of beams for each tracked target at the rates determined by the closed-loop system. In the other direction of control, block 46 decreases or decrements the data rate in response to each "Can-Track" decision by block 44. Thus, the radar resources used for each track will oscillate about that value which just keeps the target in track, thereby leaving the maximum amount of radar resources available for other targets.

Thus, according to an aspect of the invention, the maximum target maneuver radar capability A is determined, and a determination is made as to whether the target acceleration in g's is such that it can be maintained in track. If the result of this determination is that the target can be maintained in track, no action need be taken, although action may be taken if desired. If the determination is made that excess radar resources, capacity or capability is or are being used, in that there is no danger of loss of track in relation to a given target, the radar parameters may be adjusted to free up radar resources from that one target for use with other targets. If the result of the determination is that target track may be lost, the parameters of the radar system are modified so as to guarantee that track can be maintained. This results in a continual balancing of the radar resources, assigning to various targets at least sufficient capability to maintain the target in track, and increasing or decreasing resources assigned to other tracks as may be required to guarantee tracking of those other tracks. Of course, if the number of tracks and their characteristics exceeds the ultimate capability of the radar, maintaining all targets in track may not be possible, but the reallocation of radar resources will tend to optimize the likelihood of maintaining track.

In FIG. 2, the identification of the maximum maneuver of a target that the radar system can maintain in track with the current radar parameters is performed in a resource evaluation block 40, using the current track information from track processing block 32, the radar parameters from memory 34, and the track algorithm parameters from memory 36. Resource evaluation block 40 uses the radar characteristics, the target characteristics, and the tracker characteristics to form an error budget in the form of a nonlinear equation which is a function of target maneuver, tracker filter gains, radar revisit time, and measurement accuracy, which nonlinear equation is solved for the maximum target maneuver in terms of maximum number of multiples of gravity (g's) of acceleration that can be tolerated. This nonlinear equation can be solved by numerical methods such as Picard iteration, Newton-Raphson, and other methods.

Figure 3:
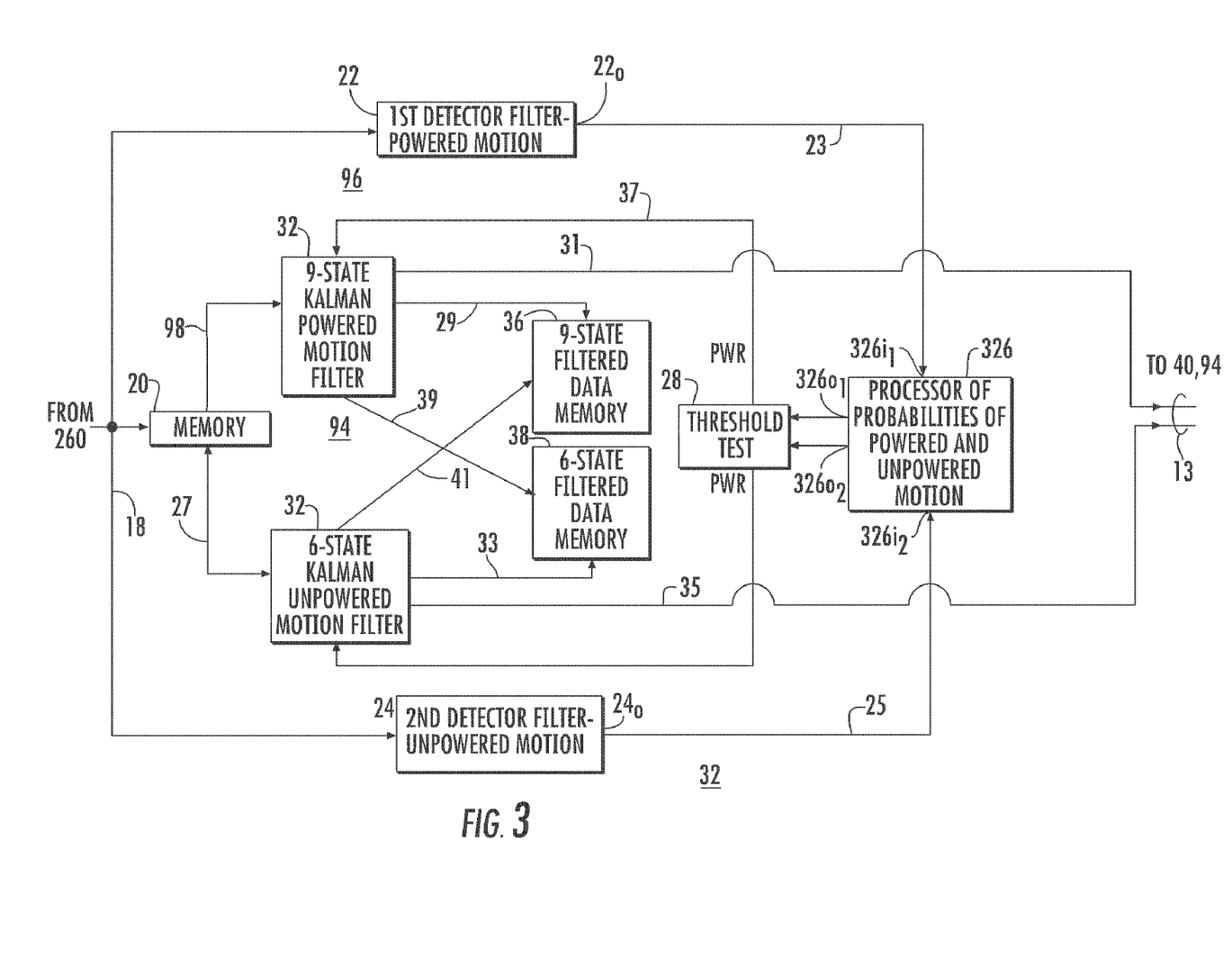
FIG. 3 is a simplified block diagram of one possible embodiment of the target track processor of FIG. 2, which makes a target boost/ballistic condition determination arrangement as described in the abovementioned Malakian et al. United States Patent application, which may be used as an acceleration detector of FIG. 2.

FIG. 3 is a simplified block diagram of one form that can be taken by track processor 32 of FIG. 2. Track filter states from a track filter and target typing likelihoods are applied by way of a path illustrated as 18 to a memory 20, and to first and second kinematic detection filters illustrated as blocks 22 and 24. Kinematic detection filters 22 and 24 are referred to jointly as a Power Detector 96. First filter block 22 has its lag or delay selected for the case of powered motion of the target, and second filter block 24 has its lag or delay selected for the case of unpowered motion of the target When data is outputted from the filters it represents the state of affairs a short duration prior to the current state of affairs. This short duration is the "lag" of the filter.

The output at port $22o$ of first filter block 22 of FIG. 3 represents the first residuals and the first residual covariances of the filtered data, and these are coupled by way of a path 23 to a first input port $326i_1$ of a processor illustrated as a block 326. The output at port $24o$ of second filter block 24 of FIG. 1 represents the second residuals and the second residual covariances of the filtered data, and these are coupled by way of a path 25 to a second input port $326i_2$ of processor 326.

Processor 326 of FIG. 1 receives the first residuals and first residual covariances at input port $326i_1$ and receives the second residuals and the second residual covariances at input port $326i_2$. Processor 326 processes the information and produces (a) at an output port $326o_1$ a measure or indication of the probability that the target missile is in a powered state and (b) at an output port $326o_2$ a measure or indication of the probability that the target missile is in an unpowered state. The signal appearing at output port $326o_1$, representing the probability of being in powered motion, tends toward unity when the missile is in powered motion and tends toward zero when the missile is in non-powered motion. The signal appearing at output port $326o_2$, representing the probability of being in unpowered motion, tends toward unity when the missile is in non-powered motion and tends toward zero when the missile is in powered motion.

The signal representing the probability that the missile is in powered flight which appears at output port $326o_1$ of processor block 326 of FIG. 1 is coupled to a threshold function illustrated as a block 28. Threshold function 28 compares the signal with a threshold value to make a determination (PWR) as to whether the missile is in powered flight. Similarly, the signal representing the probability that the missile is in unpowered flight which appears at output port $260_2$ is coupled to a threshold function illustrated as a block 28. Threshold function 28 compares the signal with a threshold value to make a determination ($\overline{PWR}$) as to whether the missile is in unpowered flight. By nature of the processor, the probability that the missile is in powered flight is one (1) minus the probability that the missile is in unpowered flight. Similarly the probability that the missile is in unpowered flight is one (1) minus the probability that the missile is in powered flight.

Regardless of whether the missile is in powered or unpowered flight, both a 9-State Kalman "powered" filter designated 32 and a 6-State Kalman "unpowered" filter designated 34 begin track filtering by initializing with the kinematic data accessed via paths 98 and 27, respectively, from data memory 20. Filtered data from the 9-State Kalman powered motion filter 32 represents target position, velocity and acceleration in the x direction, y direction, and z direction ($x, \dot{x}, \ddot{x}, y, \dot{y}, \ddot{y}, z, \dot{z}, \ddot{z}$). The filtered data from the 9-State Kalman "powered motion" filter 32 is outputted or coupled by way of a path 29 to a 9-State filtered data memory designated 36 if the threshold test determines the missile to be in powered flight, and also by way of a path 31 to an end user, which in this case includes resource evaluation block 40 and fire control system 94. If the threshold test performed in block 28 determines that the missile is not in powered flight, the filtered data from powered flight filter 32 is not stored or used. Similarly, the filtered data from the 6-State Kalman "unpowered motion" data filter 34 which represents position and velocity in the x direction, y direction, and z direction ($x, \dot{x}, y, \dot{y}, z, \dot{z}$), is sent by way of a path 33 to a 6-state filtered data memory 38 if the threshold test designated 28 determines the missile to be in unpowered flight, and is not stored or used if the threshold test determines that the missile is not in unpowered flight. The filtered data from the 6-State Kalman "unpowered motion" data filter 34 is also sent by way of a path 35 to the end user. Paths 31 and 35 are jointly referred to as path 13.

First "powered motion" detector 22 and second "unpowered motion" detector 24 of FIG. 3 continually filter the raw data provided by block 26 of FIG. 2. Prior to a time at which the target missile 16 changes from unpowered flight to powered flight, 6-state filter 34 will have been filtering the data and storing information in 6-state memory 38. When missile 16 changes from unpowered flight to powered flight, threshold test block 28 alerts the 9-state Kalman "powered motion" filter 32 via path 37. The 9-state Kalman filter for powered motion accesses the 6-state filtered data memory 38 via path 39 for the filtered data provided at t-lag, where t-lag represents the current time minus the lag duration. This data initializes the 9-State "powered flight" filter 32 with the most accurate available data. The raw data in memory 20 will be accessed by the 9-state Kalman filter 32, for the data points in the interval from t-lag to the current time and filters the data and continually sends the filtered data by way of path 13 to an end user. This condition continues until the missile switches from powered motion to unpowered motion and the threshold test 28 alerts the change. The 6-State Kalman filter for unpowered motion 34, will then access the t-lag data stored in the 9-state filtered data memory 36 via link 41, and initialize using the t-lag stored data. Six-state Kalman filter 34 then continues to filter the data in the interval from t-lag to the current time data which is stored in memory 20, and provides filtered data to the end user by way of path 35.

In order to maintain an object or target in closed-loop track, the object must be maintained within the radar beamwidth. This requirement is expressed as $$k\sigma_{RES} + b_P \leq \tfrac{1}{2} BW$$

where:
k is the containment probability factor; $\sigma_{RES}$ is the tracking filter residual standard deviation;
$b_p$ is the tracking filter bias; and
BW is the beam-width of the radar in radians. Equation 1.1 represents a first step in the derivation of the express equations required to control the radar system. In order to find the maximum target maneuver which can be tracked for a given radar system configuration, the left side of equation 1.1 is set equal to the right side $$k\sigma_{RES} + b_P = \tfrac{1}{2} BW$$

The tracking filter residual standard deviation $\sigma_{RES}$ is given by $$\sigma_{RES} = \frac{\sigma_M}{\sqrt{1-\alpha}} \qquad 1.3$$

where:
$\sigma_M$ is the measurement error standard deviation given by $$\sigma_M = R\sigma_A$$

where:
R is the target slant range in meters;
$\sigma_A$ is the angle error standard deviation; and
$\alpha$ is the filter gain given by $$\alpha = 1 - \left(\frac{\tau}{\tau + T}\right)^2 \qquad 1.5$$

where:
T is the look rate of the radar system; and
$\tau$ is the tracking filter lag in seconds, given by $$\tau = T^{\tfrac{1}{5}} \left(\frac{3n\sigma_M}{2A}\right)^{\tfrac{2}{5}} \qquad 1.6$$

where:
n is the tracking filter factor; and
A is the target acceleration in meters per second.

As the radar system tracking filter 32 of FIG. 2 reduces noise, increasing filter lag can be a penalty of the noise reduction. If the target's motion deviates from the kinematic equations described in the filter (i.e. target acceleration), the lag manifests itself into position and velocity values being or lagging behind the actual values.

Target acceleration A is the parameter which is solved to determine the capability of the radar system to track target accelerations. In an embodiment of the invention, the target acceleration is solved for by using a numerical method.

The expression for the tracking filter bias is given by $$b_P = \frac{AT^2}{\beta} \qquad 1.7$$

where:
$\beta$ is the filter gain given by $$\beta = 2\left(\frac{T}{T+\tau}\right)^2 \qquad 1.8$$

The parameters appearing in equations 1.9 and 1.10 are required to determine the capability of the system to track target accelerations. Determination of capability to track targets with a given acceleration is achieved by solving for target acceleration A from the non-linear equation 1.2. Rearranging and simplifying equation 1.2 yields the following expression for the maximum target acceleration A that the radar system can track $$A_{j+1} = \frac{R(BW)}{(\tau_j + T)^2} - \frac{2K\sigma_M}{\tau_j(\tau_j + T)} \qquad 1.9$$

where $$\tau_j = T^{\tfrac{1}{5}} \left(\frac{3n\sigma_M}{2A_j}\right)^{\tfrac{2}{5}} \qquad 1.10$$

Equation 1.9 assumes the radar parameters of beamwidth (BW), data rate (T), range to target (R), and measurement accuracy ($\sigma_M$), where $\sigma_M$=Range*$\sigma_A$. An initial value of acceleration ($A_j$) is implicit in $\tau_j$. If the target acceleration exceeds the radar system capability, then the target may no longer be tracked successfully. Equation 1.9 is implemented in block 40 of FIG. 2. With this expression, the maximum target maneuver system capability A is solved for using an iterative numeric method. In a particular embodiment, the Picard iterative method was used. The resulting target acceleration is made available at output port 400 of block 40 of FIG. 2.

While the description of the invention is couched in terms of a radar system, those skilled in the art know that electromagnetic radiation may be at any frequency. Thus, the principles of radar ranging may be used at light frequencies or wavelengths in ranging systems known as lidar, and the term "radar" should be interpreted to include light-based systems.

A tracking radar system (12) according to an aspect of the invention is for transmitting electromagnetic signals (14) toward a tracked target (16, 16b, . . . ), and for receiving and processing reflected signals to determine at least the location of the tracked target. The radar system (12) comprises a transmitter/receiver (9), which transmitter/receiver (9) includes an antenna (12a), an exciter (24), and a controllable beam scheduler (28), for illuminating the tracked target (16a, 16b, . . . ) at a rate established by the beam scheduler (28). A track processor (32) is coupled to the transmitter/receiver (9), for determining the acceleration of each target in track. A radar resource evaluator (40) is coupled to the track processor (32) for determining the maximum target acceleration which can be maintained in track for each target. An acceleration comparator (44) is coupled to the track processor (32) and to the resource evaluator (40), for making a decision as to whether each target can be maintained in track. A data rate selector (46) controls the beam scheduler (28) in response to the decision so as to increase the radar resources available for tracking at least some of the targets for which the decision is negative. In one embodiment of the radar system (12), the data rate selector (46) increases the beam schedule rate for at least some of the targets for which the decision is negative. In another embodiment, the data rate selector (46) decreases the beam schedule rate for at least some of the targets for which the decision is positive. In a particular embodiment, the radar resource evaluator (40) includes processing which solves the following expression for the maximum target acceleration A that the radar system can track $$A_{j+1} = \frac{R(BW)}{(\tau_j + T)^2} - \frac{2K\sigma_M}{\tau_j(\tau_j + T)}$$

where $$\tau_j = T^{\frac{1}{3}}\left(\frac{3n\sigma_M}{2A_j}\right)^{\frac{2}{3}}$$

and:
R is radar slant range;
BW is antenna beamwidth;
K is containment probability factor;
n is filter factor;
$\sigma_M$ is measurement error standard deviation;
$\tau$ is filter lag; and
T is the data rate.

A method according to an aspect of the invention is for optimizing the operation of a radar system (12) operable in target (16) tracking mode. The method comprises the steps of transmitting electromagnetic energy (14) into space by way of an antenna (12a), and receiving reflected energy from one or more targets (16). The antenna (12a) may be an array antenna. The reflected energy is processed (32) to either start a new track or to update an existing track. The motion of the target (16) in question is examined (32) to determine if the target is maneuvering. If the target (16) is identified as not maneuvering, a first selected target update time is assigned (46). If the target is identified as maneuvering, a second selected target update time is assigned, which is shorter or less than the first selected target update time. In a particular mode of the method, the identification as maneuvering includes identification as boosting or as ballistic maneuvering.

A method for operating a radar (12) system which includes a transmitter (22TX), a receiver (22RX), and processing (26, 30) for generating target tracks, where the radar (12) system defines a look rate. The method comprises the steps of operating the radar with a selected antenna beamwidth (BW), look rate (T), and standard deviation of the angular error ($\sigma_A$), to generate target track information. The range to each target is determined. At least tracker containment probability factor (k), containment probability confidence factor of the filter error (n), filter lag ($\tau$), and filter gains ($\alpha$ and $\beta$) are determined (32, 40). The maximum target maneuver radar capability (A) is determined (44). If the maximum target maneuver radar capability (A) is exceeded by a target, the data rate (T) is increased (46) for at least that target, to thereby increase the maximum target maneuver radar capability so as to tend to maintain the target (16) in track.

What is claimed is:

1. A method for operating a radar system operable in target tracking mode, said method comprising the steps of:
    transmitting electromagnetic energy into space by way of an antenna;
    receiving reflected energy from a target;
    processing said reflected energy to start a new track or to update an existing track;
    examining motion of said target to determine if the target is maneuvering;
    if said target is identified as not maneuvering, assigning a first selected target update time; and
    if said target is identified as maneuvering, assigning a second selected target update time, wherein said second selected target update time is less than said first selected target update time.

2. The method of claim 1, wherein the transmitting, receiving, processing, examining and assigning steps are repeatedly performed such that radar resources used for the target oscillate about a value that keeps the target in track and leaves a maximum amount of radar resources available for other targets.

3. The method of claim 2, wherein said receiving step comprises receiving reflected energy from a plurality of targets, and said processing, examining and assigning steps are performed for each target of said plurality of targets such that different target update times will be assigned to different ones of said plurality of targets.

4. The method of claim 3, wherein said repeated assigning steps oscillates radar resources used for at least one of said plurality of targets.

5. A method for operating a radar system operable in target tracking mode, said method comprising the steps of:
    transmitting electromagnetic energy into space by way of an array antenna at a controllable data rate;
    receiving reflected energy from a target;
    processing said reflected energy to start a new track or to update an existing track;

examining motion of said target to determine if the target is boosting or ballistic maneuvering;

if said motion of said target is ballistic maneuvering, assigning a first selected target update time;

if said motion of said target is identified as boosting maneuvering, assigning a second selected target update time, wherein said second selected target update time is less than said first selected target update time.

6. The method of claim 5, wherein the transmitting, receiving, processing, examining and assigning steps are repeatedly performed such that radar resources used for the target oscillate about a value that keeps the target in track and leaves a maximum amount of radar resources available for other targets.

7. The method of claim 6, wherein said receiving step comprises receiving reflected energy from a plurality of targets, and said processing, examining and assigning steps are performed for each target of said plurality of targets such that different target update times will be assigned to different ones of said plurality of targets.

8. The method of claim 7, wherein said repeated assigning steps oscillates radar resources used for at least one of said plurality of targets.

9. A method for operating a radar system which includes a transmitter, a receiver, and processing for generating target tracks, said radar system having a look rate, said method comprising the steps of:

operating said radar with a selected antenna beamwidth, look rate, and standard deviation of angular error, to generate target track information;

determining the range of each of a plurality of targets;

determining at least a tracker containment probability factor, a containment probability confidence factor of the filter error, a filter lag, and filter gains;

determining a maximum target maneuver radar capability;

if the maximum target maneuver radar capability is exceeded by a target of said plurality of targets, increasing a pulse rate to thereby increase the maximum target maneuver radar capability.

10. The method of claim 9, wherein the maximum target maneuver radar capability is based on at least the containment probability factor and the antenna beamwidth.

11. The method of claim 9, wherein the step of determining a maximum target maneuver radar capability is performed using an iterative numeric method.

12. The method of claim 11, wherein the iterative numeric method is a Picard method or a Newton-Raphson method.

13. The method of claim 9, wherein if the maximum target maneuver radar capability is not exceeded by a target of said plurality of targets, decreasing a pulse rate.

14. The method of claim 13, wherein the step of decreasing a pulse rate frees up radar resources from that one target for use with other targets.

15. The method of claim 14, wherein the steps of increasing a pulse rate and decreasing a pulse rate oscillates radar resources used for at least one of said plurality of targets.

16. A tracking radar system for transmitting electromagnetic signals toward a plurality of tracked targets and for receiving and processing reflected signals to determine at least a location of each of said plurality of tracked targets, said radar system comprising:

a transmitter/receiver including an antenna, an exciter, and a controllable beam scheduler, for illuminating said tracked targets at a rate established by the beam scheduler;

a track processor coupled to said transmitter/receiver, for determining acceleration of each target in track;

a radar resource evaluator coupled to said track processor for determining a maximum target acceleration which can be maintained in track for each target;

an acceleration comparator coupled to said track processor and to said resource evaluator, for deciding whether each of said plurality of targets can be maintained in track; and a data rate selector controlling said beam scheduler in response to said decision to increase said radar resources available for tracking at least some of said targets for which said decision is negative.

17. A radar system according to claim 16, wherein said data rate selector increases a beam schedule rate for at least some of said targets for which said decision is negative.

18. A radar system according to claim 16, wherein said data rate selector decreases a beam schedule rate for at least some of said targets for which said decision is positive.

19. A radar system according to claim 16, wherein said radar resource evaluator includes processing which solves the following expression for the maximum target acceleration A that the radar system can track $$A_{j+1} = \frac{R(BW)}{(\tau_j + T)^2} - \frac{2K\sigma_M}{\tau_j(\tau_j + T)}$$

where $$\tau_j = T^{\frac{1}{5}} \left( \frac{3n\sigma_M}{2A_j} \right)^{\frac{2}{5}}$$

and:
R is radar slant range;
BW is antenna beamwidth;
K is containment probability factor;
n is a filter factor;
$\sigma_M$ is measurement error standard deviation;
$\tau$ is filter lag; and
T is the data rate.

20. The system of claim 16, wherein said acceleration comparator outputs a "can-track"/"can't track" decision, wherein a "can-track" decision indicates that the target can be maintained in track using a current beam schedule rate, and a "can't-track decision" indicates that the target cannot be maintained in track using the current beam schedule rate.

* * * * *